United States Patent
Wang et al.

(10) Patent No.: US 10,228,759 B2
(45) Date of Patent: Mar. 12, 2019

(54) DISTANCE SENSING SUBSTRATE, DISPLAY DEVICE, DISPLAY SYSTEM AND RESOLUTION ADJUSTMENT METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wei Wang, Beijing (CN); Hao Zhang, Beijing (CN); Lingyun Shi, Beijing (CN); Xue Dong, Beijing (CN); Chong Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/527,072

(22) PCT Filed: Jan. 15, 2016

(86) PCT No.: PCT/CN2016/071038
§ 371 (c)(1),
(2) Date: May 16, 2017

(87) PCT Pub. No.: WO2017/024771
PCT Pub. Date: Feb. 16, 2017

(65) Prior Publication Data
US 2017/0364142 A1    Dec. 21, 2017

(30) Foreign Application Priority Data

Aug. 12, 2015  (CN) .......................... 2015 1 0494471

(51) Int. Cl.
*G06F 3/01* (2006.01)
*G06T 3/40* (2006.01)
(Continued)

(52) U.S. Cl.
CPC ............... *G06F 3/011* (2013.01); *G06F 3/01* (2013.01); *G06T 3/40* (2013.01); *G09G 5/00* (2013.01);
(Continued)

(58) Field of Classification Search
CPC ... G09G 2340/0407; G09G 2340/0414; G09G 2340/0421; G09G 2340/0428; G09G 2340/0435
See application file for complete search history.

(56) References Cited

U.S. PATENT DOCUMENTS

2008/0074444 A1 * 3/2008 Morikawa .............. G09G 5/005
345/660
2008/0122798 A1   5/2008 Koshiyama et al.
(Continued)

FOREIGN PATENT DOCUMENTS

CN   103578445 A   2/2014
CN   104361849 A   2/2015
(Continued)

OTHER PUBLICATIONS

Second Office Action for Chinese Patent Application No. 201510494471.7 dated Jul. 4, 2017.
(Continued)

*Primary Examiner* — Benjamin C Lee
*Assistant Examiner* — Dong Hui Liang
(74) *Attorney, Agent, or Firm* — Calfee, Halter & Griswold LLP (57) ABSTRACT

A distance sensing substrate, a display device, a display system, and a resolution adjustment method are disclosed.
(Continued)

The above distance sensing substrate includes a particle emitter for emitting a first particle beam to a viewer; a particle receiver for receiving the first particle beam reflected by the viewer; and a processing unit for obtaining an energy density of the emitted first particle beam and an energy density of the received first particle beam. The resolution of the display screen can be adjusted based on the viewing distance from the viewer to the display screen. When the viewing distance of the user is relatively large, the resolution of the display screen will be reduced appropriately, so as to reduce a power consumption of the display screen on the premise of ensuring a viewing effect of the user.

19 Claims, 6 Drawing Sheets

(51) Int. Cl.
 *G09G 5/10* (2006.01)
 *G09G 5/00* (2006.01)
(52) U.S. Cl.
 CPC ....... *G09G 5/10* (2013.01); *G09G 2320/0626* (2013.01); *G09G 2330/021* (2013.01); *G09G 2340/0407* (2013.01); *G09G 2340/14* (2013.01); *G09G 2354/00* (2013.01)

(56) References Cited

U.S. PATENT DOCUMENTS

| | | | | |
|---|---|---|---|---|
| 2009/0315924 A1* | 12/2009 | Chou | ............... | G09G 5/00 345/698 |
| 2010/0171697 A1* | 7/2010 | Son | ............... | G06F 3/012 345/158 |
| 2011/0012115 A1* | 1/2011 | Jeon | ............... | G02F 1/13338 257/59 |
| 2011/0037732 A1* | 2/2011 | Takama | ............... | G06F 3/0412 345/175 |
| 2011/0128553 A1* | 6/2011 | Nakanishi | ............... | G06F 3/0304 356/614 |
| 2012/0181255 A1* | 7/2012 | Bruck | ............... | B23K 9/324 219/73.2 |
| 2013/0056732 A1* | 3/2013 | Jung | ............... | G06F 3/0412 257/53 |
| 2014/0028545 A1 | 1/2014 | Tsai | | |
| 2015/0014536 A1* | 1/2015 | Qian | ............... | G01S 17/10 250/338.4 |
| 2015/0221064 A1 | 8/2015 | Thomas et al. | | |
| 2017/0046815 A1 | 2/2017 | Wang et al. | | |

FOREIGN PATENT DOCUMENTS

| | | |
|---|---|---|
| CN | 104618575 A | 5/2015 |
| CN | 105100506 A | 11/2015 |
| CN | 105183149 A | 12/2015 |
| WO | WO 2007113580 A1 * 10/2007 | ............. H04N 5/775 |

OTHER PUBLICATIONS

International Search Report for PCT/071038 dated May 10, 2016.
First Office Action for Chinese Patent Application No. 201510494471.7 dated Dec. 1, 2016.
International Search Report for PCT/CN2016/07138 dated May 10, 2016.

* cited by examiner

(12) United States Patent

DISTANCE SENSING SUBSTRATE, DISPLAY DEVICE, DISPLAY SYSTEM AND RESOLUTION ADJUSTMENT METHOD

The present application is the U.S. national phase entry of PCT/CN2016/071038, with an international filing date of Jan. 15, 2016, which claims the benefit of Chinese Patent Application No. 201510494471.7, filed on Aug. 12, 2015, the entire disclosure of which is incorporated herein by reference.

TECHNICAL FIELD

The present disclosure relates to the field of display technology, particularly to a distance sensing substrate, a display device, a display system and a resolution adjustment method.

BACKGROUND

High Pixels Per Inch (PPI) has been always an importance target in the display field, and once became an important selling point of products such as mobile phones and televisions etc. However, the high PPI also brings some disadvantages while bringing advantages of good viewing effect and so on. The high PPI will result in increase in the data processed by the graphics processing unit (GPU), thereby leading to a large power consumption of the battery.

Actually, a resolution of human eyes is not always changeless. It will change at any time based on the distance, the environment, and the running speed of the image. One of the important theories is exactly the "retina" standard proposed by Apple Inc. When a distance between the viewer and the display screen is 10-12 inches (about 25-30 cm), the viewer's retina will not be able to resolve pixel points, i.e., will not have granular sensation, as long as the resolution of the display screen reaches 300 pixel points per inch (300 ppi).

Therefore, when human eyes are very close to the mobile phone, a high resolution of the mobile phone itself can be used, in order to enable a consumer not to see small flaws of the display screen and try to exhibit perfect images. However, when the screen is relatively far from the user, even if the resolution does not meet the above resolution, the user will not resolve the pixel points either. Hence, it is not necessary to keep the display screen at a relatively high resolution all the time and thus result in too much power consumption.

SUMMARY

The technical problem to be solved by the present disclosure is how to adjust a resolution of the display screen based on a viewing distance of a user.

The present disclosure includes a distance sensing substrate. The distance sensing substrate comprises a particle emitter for emitting a first particle beam to a viewer; a particle receiver for receiving the first particle beam reflected by the viewer; and a processing unit for obtaining an energy density of the emitted first particle beam and an energy density of the received first particle beam.

In certain exemplary embodiments, the particle receiver comprises a plurality of first conducting lines arranged in a first direction and a plurality of second conducting lines arranged in a second direction. The plurality of first conducting lines and the plurality of second conducting lines intersect with each other, so as to define a plurality of receiving areas. The plurality of first conducting lines transmit scanning signals line by line. Each receiving area comprises: a receiving electrode for receiving the particle beam so as to generate an excitation current; and a switch thin film transistor for allowing conduction between the receiving electrode and a corresponding second conducting line when a corresponding first conducting line transmits a scanning signal, so as to enable the excitation current generated by the receiving electrode to be transmitted to the corresponding second conducting line.

In certain exemplary embodiments, the distance sensing substrate further comprises a plurality of gate lines and a plurality of data lines. The plurality of gate lines and the plurality of gate lines intersect with each other, so as to define a plurality of pixel areas. Each pixel area comprises a driving thin film transistor.

In certain exemplary embodiments, projections of the plurality of first conducting lines and the plurality of gate lines on a base of the distance sensing substrate coincide. Projections of the plurality of second conducting lines and the plurality of data lines on the base of the distance sensing substrate coincide. Projections of the switch thin film transistor and the driving thin film transistor on the base of the distance sensing substrate coincide.

In certain exemplary embodiments, each pixel area further comprises a pixel electrode. The plurality of first conducting lines are formed over the plurality of gate lines. The plurality of second conducting lines are formed over the plurality of data lines. The switch thin film transistor is formed over the driving thin film transistor. The receiving electrode is formed over the pixel electrode.

In certain exemplary embodiments, the first particle beam is infrared light.

In certain exemplary embodiments, the first particle beam is an electron beam.

The present disclosure further proposes a display device comprising a display screen. The display device further comprises the distance sensing substrate as stated above; and an adjustment unit for adjusting a resolution of the display screen according to the energy density of the emitted first particle beam and the energy density of the received first particle beam.

In certain exemplary embodiments, the processing unit obtains a viewing distance from the viewer to the display screen according to the energy density of the emitted first particle beam and the energy density of the received first particle beam. The adjustment unit adjusts the resolution of the display screen based on the viewing distance.

In certain exemplary embodiments, the processing unit is further used for obtaining an exit position of the first particle beam and an incident position of the first particle beam on the display screen, so as to obtain a first distance from the exit position to the incident position, obtain a second distance of propagation of the first particle beam according to an attenuated energy density of the first particle beam, and obtain the viewing distance according to the first distance and the second distance.

In certain exemplary embodiments, the processing unit is further used for determining the incident position of the first particle beam according to the first conducting line transmitting the scanning signal and the second conducting line transmitting the excitation current.

In certain exemplary embodiments, the processing unit obtains an attenuated energy density of the first particle beam according to the energy density of the emitted first particle beam and the energy density of the received first particle beam. If the attenuated energy density is larger than a first preset value, it is determined that the viewing distance is larger than a first value. Alternatively, if the attenuated energy density is smaller than a second preset value, it is determined that the viewing distance is smaller than a second value. The adjustment unit adjusts the resolution of the display screen based on the viewing distance.

In certain exemplary embodiments, the adjustment unit reduces the resolution of the display screen when the viewing distance is larger than the first value.

In certain exemplary embodiments, the adjustment unit increases the resolution of the display screen when the viewing distance is smaller than the second value.

In certain exemplary embodiments, the display device further comprises a face recognition unit for recognizing whether the viewer's face faces towards the display screen. The adjustment unit reduces the resolution of the display screen when the viewer's face does not face towards the display screen.

The present disclosure further proposes a display system comprising the above display device. The display system further comprises a wearable device for emitting a second particle beam to the display device when the particle emitter does not emit the first particle beam. The processing unit is further used for detecting an energy density of the received second particle beam. Besides, the adjustment unit is further used for adjusting the resolution of the display screen according to the energy density of the received second particle beam.

The present disclosure further proposes a resolution adjustment method based on the above display device. The resolution adjustment method comprises: emitting a first particle beam to a viewer; receiving the first particle beam reflected by the viewer; and adjusting a resolution of the display screen according to an energy density of the emitted first particle beam and an energy density of the received first particle beam.

In certain exemplary embodiments, the step of adjusting a resolution of the display screen according to an energy density of the emitted first particle beam and an energy density of the received first particle beam comprises obtaining a viewing distance according to the energy density of the emitted first particle beam and the energy density of the received first particle beam; and adjusting the resolution of the display screen based on the viewing distance.

In certain exemplary embodiments, the step of obtaining a viewing distance according to the energy density of the emitted first particle beam and the energy density of the received first particle beam comprises obtaining an exit position of the first particle beam and an incident position of the first particle beam on the display screen, so as to obtain a first distance from the exit position to the incident position; obtaining a second distance of propagation of the first particle beam according to an attenuated energy density of the first particle beam; and obtaining the viewing distance according to the first distance and the second distance.

In certain exemplary embodiments, the step of adjusting a resolution of the display screen according to an energy density of the emitted first particle beam and an energy density of the received first particle beam comprises obtaining an attenuated energy density of the first particle beam according to the energy density of the emitted first particle beam and the energy density of the received first particle beam; determining that the viewing distance is larger than a first value if the attenuated energy density is larger than a first preset value; and determining that the viewing distance is smaller than a second value if the attenuated energy density is smaller than a second preset value.

In certain exemplary embodiments, the step of adjusting a resolution of the display screen comprises: reducing the resolution of the display screen when the viewing distance is larger than the first value.

In certain exemplary embodiments, the step of adjusting a resolution of the display screen comprises increasing the resolution of the display screen when the viewing distance is smaller than the second value.

In certain exemplary embodiments, the resolution adjustment method further comprises: recognizing whether a viewer's face faces towards the display screen, and reducing the resolution of the display screen when the viewer's face does not face towards the display screen.

The present disclosure further proposes a resolution adjustment method based on the above display system. The resolution adjustment method comprises emitting a second particle beam to a display device; detecting, by the display device, an energy density of the received second particle beam, and adjusting the resolution of the display screen according to the energy density of the received second particle beam.

By means of the above technical solutions, the resolution of the display screen can be adjusted based on the viewing distance from the viewer to the display screen. When the viewing distance of the user is relatively large, the resolution of the display screen will be reduced appropriately, so as to reduce a power consumption of the display screen on the premise of ensuring a viewing effect of the user.

BRIEF DESCRIPTION OF THE DRAWINGS

The features and advantages of the present disclosure will be understood more clearly by making reference to the drawings. The drawings are schematic and should not be understood as any limitations to the present disclosure. In the drawings.

DETAILED DESCRIPTION OF THE EMBODIMENTS

In order to understand the above purposes, features and advantages of the present disclosure more clearly, the present disclosure will be described in more details with reference to the drawings and the specific embodiments. It should be noted that, embodiments and features in the embodiments of the present application can be combined with each other, if not conflicting.

Many details will be elaborated in the following description so as to facilitate sufficient understanding of the present disclosure. However, the present disclosure can also be carried out in other ways different from those described herein. Hence, the protection scope of the present disclosure is not limited by any specific embodiment disclosed below.

Figures 1, 2:
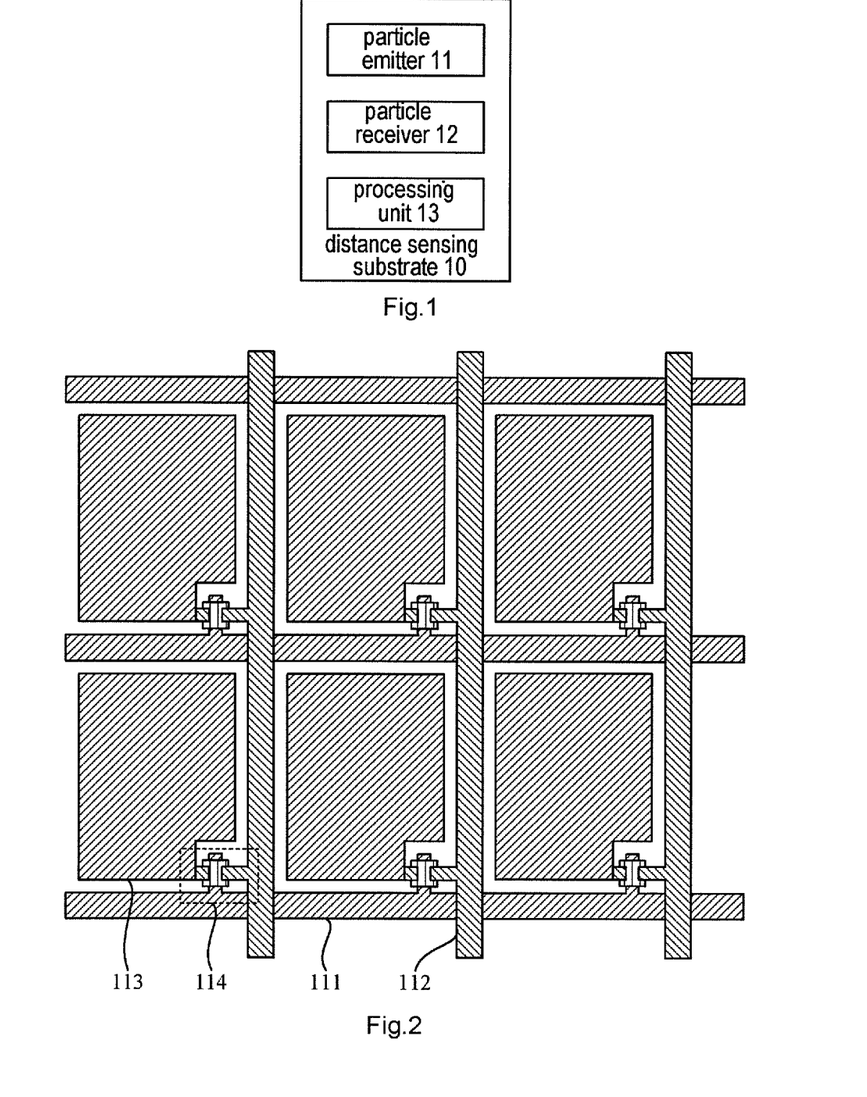
FIG. 1 shows a schematic block diagram of a distance sensing substrate according to certain exemplary embodiments of the present disclosure.
FIG. 2 and FIG. 3 show structural schematic views of a particle receiver according to certain exemplary embodiments of the present disclosure.

As shown in FIG. 1, a distance sensing substrate 10 according to one embodiment of the present disclosure comprises: a particle emitter 11 for emitting a first particle beam to a viewer; a particle receiver 12 for receiving the first particle beam reflected by the viewer; and a processing unit 13 for obtaining an energy density of the emitted first particle beam and an energy density of the received first particle beam.

The distance sensing substrate 10 in this embodiment can be arranged on a display screen 21 of a display device 20. Generally, when the user views the display screen 21, his eyes are relatively close to the display screen 21. For example, when viewing the display screen of a mobile phone, the distance is generally at about 20cm. Because the particles are emitted at an extremely high speed, it will be difficult to determine a time different between emitting particles and receiving particles. Hence, the distance calculated based on this time difference will also be not accurately enough.

In this embodiment, the distance is determined by detecting an energy density of the emitted first particle beam and an energy density of the received first particle beam. In this way, as compared with the way for determining the distance by detecting the time difference between emitting particles and receiving particles, the accuracy for determining the distance can be improved greatly.

In this embodiment, a value range for a viewing distance from the viewer to the display screen 21 can be determined based on the energy density of the emitted first particle beam and the energy density of the received first particle density. Thereby the resolution of the display screen 21 can be adjusted based on the value range of the viewing distance. When the viewing distance of the user is relatively large, the resolution of the display screen 21 can be reduced appropriately. Thus a power consumption of the display screen can be reduced on the premise of ensuring a viewing effect of the user.

Figure 3:
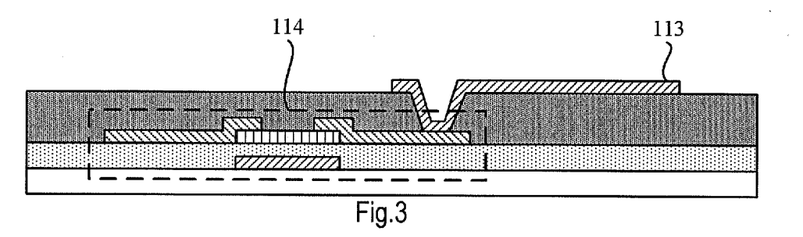

As shown in FIG. 2 and FIG. 3, the particle receiver 11 can comprise: a plurality of first conducting lines 111 arranged in a first direction and a plurality of second conducting lines 112 arranged in a second direction. The plurality of first conducting lines 111 and the plurality of second conducting lines 112 intersect with each other, so as to define a plurality of receiving areas. The plurality of first conducting lines 111 transmit scanning signals line by line. Each receiving area comprises: a receiving electrode 113 for receiving the particle beam so as to generate an excitation current; and a switch thin film transistor 114 for allowing conduction between the receiving electrode 113 and a corresponding second conducting line when a corresponding first conducting line 111 transmits a scanning signal, so as to enable the excitation current generated by the receiving electrode 113 to be transmitted to the corresponding second conducting line 112.

In this embodiment, the structure of the particle receiver 12 is similar to that of the array substrate in the display device. The particle receiver 12 can be in a planar shape, so as to be convenient to receive the incident particle beam.

Figure 4:
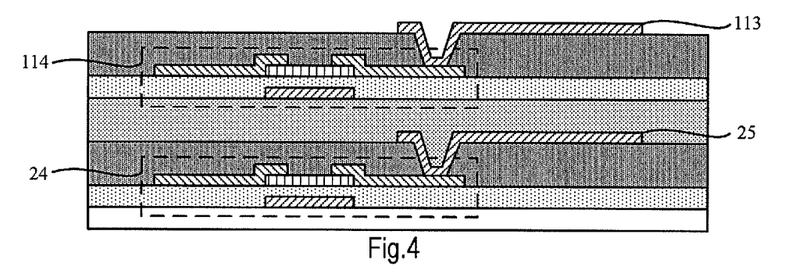
FIG. 4 shows a schematic view of a relationship between the particle receiver and the display device according to certain exemplary embodiments of the present disclosure.

As shown in FIG. 4, the distance sensing substrate can further comprise: a plurality of gate lines and a plurality of data lines. The plurality of gate lines and the plurality of gate lines intersect with each other, so as to define a plurality of pixel areas. Each pixel area comprises a driving thin film transistor 24.

In this embodiment, the distance sensing substrate 10, in addition to being capable of emitting and receiving the first particle beam so as to implement functions relevant to distance detection, can also implement the function of display driving through structures such as the gate, the data line and the driving thin film transistor. When the distance sensing substrate 10 is arranged in the display device 20, the distance sensing substrate 10, on the one hand, can serve as a distance sensor of the display device 20 to implement functions relevant to distance detection. On the other hand, the distance sensing substrate 10 can serve as an array substrate of the display device 20 to implement functions relevant to display driving. Thereby, integrations of the relevant functional modules in the distance sensing substrate 10 can be improved.

Projections of the plurality of first conducting lines 111 and the plurality of gate lines on a base of the distance sensing substrate 10 coincide. Projections of the plurality of second conducting lines 112 and the plurality of data lines on the base of the distance sensing substrate 10 coincide. Projections of the switch thin film transistor 114 and the driving thin film transistor 24 on the base of the distance sensing substrate 10 coincide.

In this embodiment, when the distance sensing substrate 10 implements functions relevant to both display driving and distance detection, the plurality of first conducting lines 111 and the plurality of second conducting lines 112 will not block the pixel area. Thereby, an aperture opening ratio of the pixel area will not be influenced.

Further, projections of the switch thin film transistor 114 and the driving thin film transistor 24 on the base of the distance sensing substrate 10 can also be set to coincide, so that the switch thin film transistor 114 will not influence the aperture opening ratio of the pixel area.

Each pixel area can further comprise a pixel electrode 25. The plurality of first conducting lines 111 are formed over the plurality of gate lines. The plurality of second conducting lines 112 are formed over the plurality of data lines. The switch thin film transistor 114 is formed over the driving thin film transistor 24. Besides, the receiving electrode 113 is formed over the pixel electrode 25.

In this embodiment, after the driving thin film transistor 24 and the pixel electrode 25 are formed, a plurality of first conducting lines 111, a plurality of second conducting lines 112, a switch thin film transistor 114 and a receiving electrode 13 can be further formed. In this case, a structure layer of the distance sensing substrate 10 that implements functions relevant to display driving and a structure layer that implements functions relevant to distance detection can be formed in a whole structure. Thereby, integrations of the distance sensing substrate 10 can be improved and a thickness of the distance sensing substrate 10 will be reduced.

Apparently, a structure layer that implements functions relevant to display driving and a structure layer that implements functions relevant to distance detection can be manufactured respectively as needed. And then the two structure layers are fitted together.

The first particle beam can be infrared light.

In this case, the distance is measured by emitting and receiving infrared light. On the one hand, because the infrared light is invisible light, interference to viewing of the user can be avoided. On the other hand, because the infrared light has much small damage to human body relative to UV light, minimum damage to the human body can be ensured while implementing distance determination.

The first particle beam can be an electron beam.

In this case, the distance is measured by emitting and receiving the electron beam. On the one hand, because human eyes cannot observe the electron beam, interference to the viewing of the user can be avoided. On the other hand, because the energy density of the electron beam is relatively large, it can still have a relatively high energy density after being reflected by the viewer's face, which is easy to receive and improve the subsequent calculation accuracy.

Figure 5:
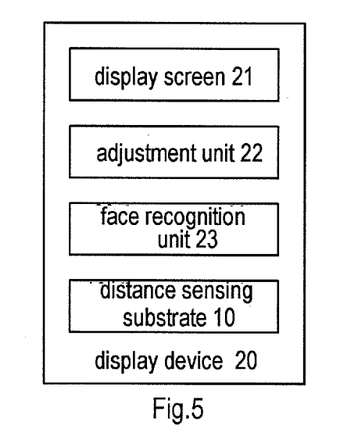
FIG. 5 shows a schematic block diagram of a display device according to certain exemplary embodiments of the present disclosure.

As shown in FIG. 5, the present disclosure further proposes a display device 20. The display device 20 comprises a display screen 21, the above distance sensing substrate 10, and an adjustment unit 22 for adjusting a resolution of the display screen 21 according to the energy density of the emitted first particle beam and the energy density of the received first particle beam.

In this embodiment, a value range of the viewing distance from the viewer to the display screen 21 can be determined based on the energy density of the emitted first particle beam and the energy density of the received first particle beam, so as to adjust the resolution of the display screen 21 according to the value range of the viewing distance. When the viewing distance of the user is relatively large, the resolution of the display screen 21 can be reduced appropriately, so as to reduce a power consumption of the display screen on the premise of ensuring a viewing effect of the user.

The processing unit obtains a viewing distance from the viewer to the display screen according to the energy density of the emitted first particle beam and the energy density of the received first particle beam. The adjustment unit 22 adjusts the resolution of the display screen based on the viewing distance.

For example, the energy density of the received first particle beam is I, $I=AI_0 e^{-\mu H}$. Herein, I is the energy density of the first particle beam incident onto the display screen 11 after propagation in the medium, $I_0$ is the energy density of the emitted particle beam, e is a base of natural logarithm, $\mu$ is a linear attenuation coefficient of the photon, and H is the viewing distance.

Thereby, it can be derived that $H=-(1/\mu)*\ln(I/AI_0)$.

Figure 6:
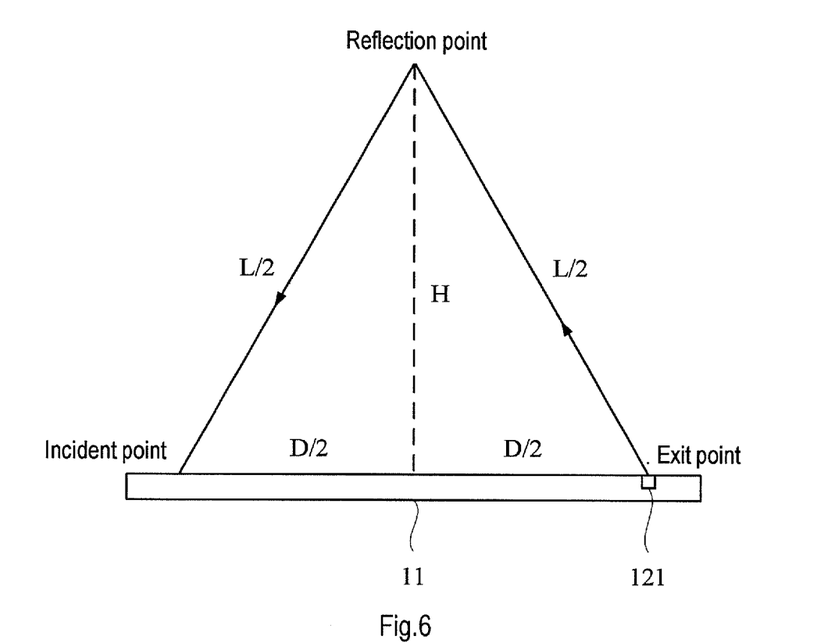
FIG. 6 shows a schematic view for calculating a viewing distance according to certain exemplary embodiments of the present disclosure.

As shown in FIG. 6, the processing unit 13 is further used for obtaining an exit position of the first particle beam and an incident position of the first particle beam on the display screen, so as to obtain a first distance from the exit position to the incident position, obtain a second distance of propagation of the first particle beam according to an attenuated energy density of the first particle beam, and obtain the viewing distance according to the first distance and the second distance.

The processing 13 is further used for determining the incident position of the first particle beam according to the first conducting line 111 that transmits the scanning signal and the second conducting line 112 that transmits the excitation current.

The exit position of the particle beam can be determined based on the position of the particle emitter 11. The exit position of the particle beam, the incident position and the reflection point of the particle beam on the viewer's face can constitute a triangle. When the viewer watches the display screen 21 in the front, a distance from the exit point of the electron beam to the reflection point is approximately equal to a distance from the reflection point to the incident point.

That is to say, generally, the above triangle can be approximately an isosceles triangle. In this case, the first distance D is a length of the base of the isosceles triangle, the second distance L is the sum of lengths of the two waists of the isosceles triangle, and the viewing distance H is a height of the isosceles triangle. Based on the Pythagorean theorem, it can be derived that $H^2+(D/2)^2=(L/2)^2$. Thereby, the viewing distance H can be obtained.

The viewing distance obtained from calculation according to this embodiment is a vertical distance from the user to the display screen 21, which is closer to the actual distance from the user to the display screen 21.

The processing unit obtains an attenuated energy density of the first particle beam according to the energy density of the emitted first particle beam and the energy density of the received first particle beam. If the attenuated energy density is larger than a first preset value, it is determined that the viewing distance is larger than a first value. Alternatively, if the attenuated energy density is smaller than a second preset value, it is determined that the viewing distance is smaller than a second value. The adjustment unit 22 adjusts the resolution of the display screen based on the viewing distance.

In this embodiment, we do not have to calculate the specific viewing distance. On the contrary, the relationship of the viewing distance with the first value and the second value can be determined based on the attenuated energy density of the first particle beam, so as to perform the adjustment operation. This simplifies the calculation step and increases the determination speed.

It should be noted that in the above embodiment, the distance sensing substrate 10 emits and receives the particle beam. Besides, the operation of calculating the energy density can be performed according to a preset period, so as to avoid too much power consumption caused by frequent calculation.

The adjustment unit 22 can reduce the resolution of the display screen when the viewing distance is larger than the first value. When the viewing distance is relatively large (larger than a first distance), the user's ability to resolve pixel points will be reduced. Hence, the resolution of the display screen 21 can be reduced, so as to realize power saving on the premise of ensuring a viewing effect of the user.

The adjustment unit 22 can increase the resolution of the display screen when the viewing distance is smaller than the second value. When the viewing distance is relatively small (smaller than a second distance), the user's ability to resolve pixel points will be increased. Hence, the resolution of the display screen 21 can be increased, so as to ensure a viewing effect of the user.

It should be noted that the second distance is smaller than the first distance. When the viewing distance is between the second distance and the first distance, the display screen 21 can be kept to display images at a normal resolution.

The display can further comprise: a face recognition unit 23 for recognizing whether the viewer's face faces towards the display screen.

The adjustment unit 22 reduces the resolution of the display screen when the viewer's face does not face towards the display screen.

When the viewer does not face towards the display screen 11, it indicates that the user does not watch the display screen, or is watching the display screen 11 sideways. If the user does not watch the display screen 11, the resolution can be reduced so as to save power. If the user is watching the display screen 11 sideways, the ability to resolve pixel points will also be reduced relative to watching the display screen 11 in the front. Hence, the resolution can also be reduced to save power.

Figure 7:
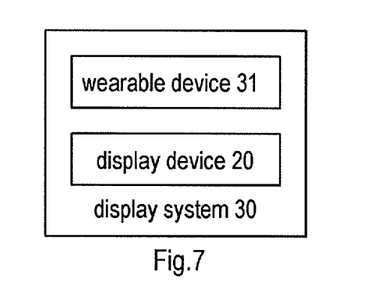
FIG. 7 shows a schematic block diagram of a display system according to certain exemplary embodiments of the present disclosure.

As shown in FIG. 7, the present disclosure further proposes a display system 30. The display system 30 comprises the above display device 20, and a wearable device 31 for emitting a second particle beam to the display device 20 when the particle emitter 11 does not emit the first particle beam. The processing unit 13 is further used for detecting an energy density of the received second particle beam. Besides, the adjustment unit is further used for adjusting the resolution of the display screen 21 according to the energy density of the received second particle beam.

The user can wear the wearable device 31 matching with the display device 20. The second particle beam is emitted to the display device by this wearable device 31. The display device 20 itself does not have to emit the first particle beam, which further improves the endurance capacity of the display device 20. The wearable device 31 can be smart glasses, smart head rings, smart earphones etc.

The display device 20 in the above embodiment can be any product or component with the display function such as electronic paper, mobile phone, panel computer, television, laptop, digital photo frame, navigator etc.

Figure 8:
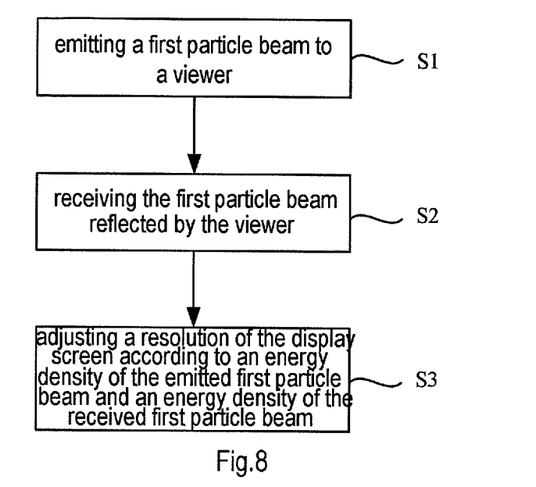
FIG. 8 shows a schematic flow chart of a resolution adjustment method according to certain exemplary embodiments of the present disclosure.

As shown in FIG. 8, the present disclosure further proposes a resolution adjustment method based on the above display device. The resolution adjustment method comprises the following steps:

S1, emitting a first particle beam to a viewer;

S2, receiving the first particle beam reflected by the viewer; and

S3, adjusting a resolution of the display screen according to an energy density of the emitted first particle beam and an energy density of the received first particle beam.

Figure 9:
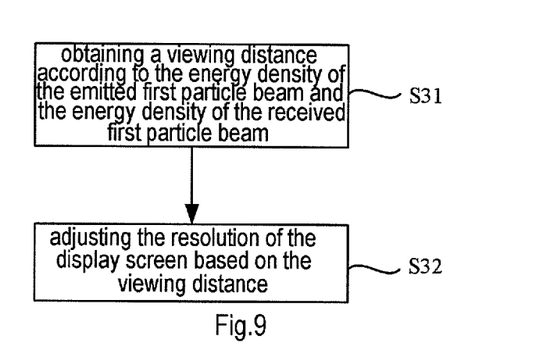
FIG. 9 shows a specific schematic flow chart of a resolution adjustment method according to certain exemplary embodiments of the present disclosure.

As shown in FIG. 9, the step of adjusting a resolution of the display screen according to an energy density of the emitted first particle beam and an energy density of the received first particle beam comprises the following sub-steps:

S31, obtaining a viewing distance according to the energy density of the emitted first particle beam and the energy density of the received first particle beam; and S32, adjusting the resolution of the display screen based on the viewing distance.

Figure 10:
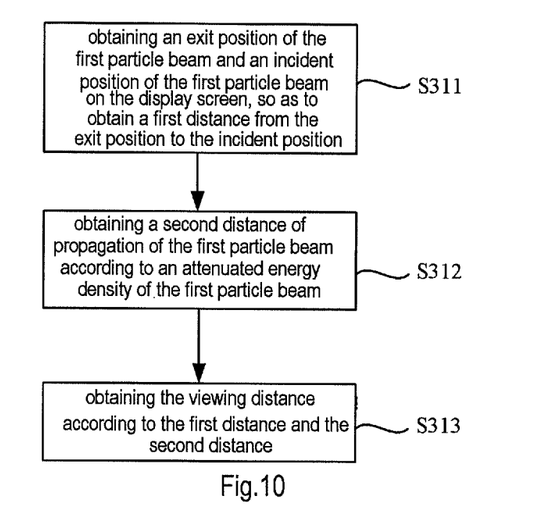
FIG. 10 shows a specific schematic flow chart for calculating a viewing distance according to a further embodiment of the present disclosure.

As shown in FIG. 10, the step of obtaining a viewing distance according to the energy density of the emitted first particle beam and the energy density of the received first particle beam comprises the following sub-steps:

S311, obtaining an exit position of the first particle beam and an incident position of the first particle beam on the display screen, so as to obtain a first distance from the exit position to the incident position;

S312, obtaining a second distance of propagation of the first particle beam according to an attenuated energy density of the first particle beam; and S313, obtaining the viewing distance according to the first distance and the second distance.

Figure 11:
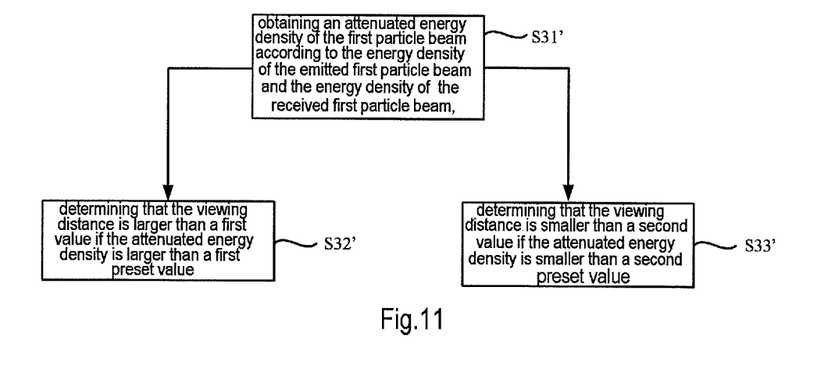
FIG. 11 shows a specific schematic flow chart of a resolution adjustment method according to a further embodiment of the present disclosure.

As shown in FIG. 11, the step of adjusting a resolution of the display screen according to an energy density of the emitted first particle beam and an energy density of the received first particle beam comprises the following sub-steps:

S31', obtaining an attenuated energy density of the first particle beam according to the energy density of the emitted first particle beam and the energy density of the received first particle beam;

S32', determining that the viewing distance is larger than a first value if the attenuated energy density is larger than a first preset value; and S33', determining that the viewing distance is smaller than a second value if the attenuated energy density is smaller than a second preset value.

The step of adjusting a resolution of the display screen can comprise the following sub-step: reducing the resolution of the display screen when the viewing distance is larger than the first value.

The step of adjusting a resolution of the display screen can comprise the following sub-step: increasing the resolution of the display screen when the viewing distance is smaller than the second value.

The resolution adjustment method can further comprise: recognizing whether a viewer's face faces towards the display screen, and reducing the resolution of the display screen when the viewer's face does not face towards the display screen.

Figure 12:
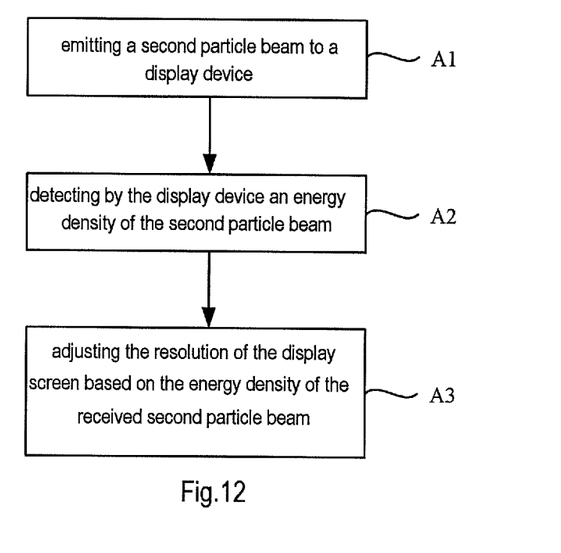
FIG. 12 shows a schematic flow chart of a resolution adjustment method according to a further embodiment of the present disclosure.

As shown in FIG. 12, the present disclosure further proposes a resolution adjustment method based on the above display system. The resolution adjustment method comprises the following steps:

A1, emitting a second particle beam to a display device;

A2, detecting by the display device an energy density of the received second particle beam; and A3, adjusting the resolution of the display screen according to the energy density of the received second particle beam.

The technical solutions of the present disclosure have been explained in detail in conjunction with the drawings. In consideration of an existing approach that a relatively high resolution is kept all the time when displaying images (which results in waste of power), by means of the technical solutions of the present disclosure, the resolution of the display screen can be adjusted based on the viewing distance from the viewer to the display screen. When the viewing distance of the user is relatively large, the resolution of the display screen will be reduced appropriately, so as to reduce a power consumption of the display screen on the premise of ensuring a viewing effect of the user.

In the present disclosure, the terms "first", "second" are only for describing purpose, and should not be understood as indicating or implying relative importance. The term "a plurality " of refers to two or more than two, unless otherwise specified.

What are stated above are only preferred embodiments of the present disclosure rather than limitations to the present disclosure. For the skilled person in the art, the present disclosure may have various modifications and variations. Any modifications, equivalent replacements, and improvements made within the spirit and the scope of the present disclosure shall be encompassed within the protection scope of the present disclosure.

The invention claimed is:

1. A distance sensing substrate comprising:
   an infrared light emitter for emitting first infrared light to a viewer;
   an infrared light receiver for receiving the first infrared light reflected by the viewer; and
   a processing unit for obtaining an energy density of the emitted first particle beam and an energy density of the received first particle beam,
   wherein the infrared light receiver comprises:
   a plurality of first conducting lines arranged in a first direction and a plurality of second conducting lines arranged in a second direction, the plurality of first conducting lines and the plurality of second conducting lines intersecting with each other so as to define a plurality of receiving areas, wherein the plurality of first conducting lines transmit scanning signals line by line, wherein each receiving area comprises:
   a receiving electrode for receiving the infrared light so as to generate an excitation current; and
   a switch thin film transistor for allowing conduction between the receiving electrode and a corresponding second conducting line when a corresponding first conducting line transmits a scanning signal, so as to enable the excitation current generated by the receiving electrode to be transmitted to the corresponding second conducting line,
   wherein the distance sensing substrate further comprises:
   a plurality of gate lines and a plurality of data lines, the plurality of gate lines and the plurality of data lines intersecting with each other so as to define a plurality of pixel areas, each pixel area comprising a driving thin film transistor, and
   wherein projections of the plurality of first conducting lines and the plurality of gate lines on a base of the distance sensing substrate coincide, projections of the plurality of second conducting lines and the plurality of data lines on the base of the distance sensing substrate coincide, and projections of the switch thin film transistor and the driving thin film transistor on the base of the distance sensing substrate coincide.

2. A display device comprising: a display screen;
   the distance sensing substrate as claimed in claim 1;
   wherein the processing unit is further configured as an adjustor for adjusting a resolution of the display screen according to the energy density of the emitted first infrared light and the energy density of the received first infrared light.

3. The display device according to claim 2, wherein
   the processing unit obtains a viewing distance from the viewer to the display screen according to the energy density of the emitted first particle beam and the energy density of the received first particle beam; and
   the adjustor adjusts the resolution of the display screen based on the viewing distance.

4. The display device according to claim 3, wherein processing unit obtains an attenuated energy density of the first particle beam according to the energy density of the emitted first particle beam and the energy density of the received first particle beam, wherein
   if the attenuated energy density is larger than a first preset value, it is determined that the viewing distance is larger than a first value, and
   if the attenuated energy density is smaller than a second preset value, it is determined that the viewing distance is smaller than a second value,
   wherein the adjustor adjusts the resolution of the display screen based on the viewing distance.

5. The display device according to claim 3, wherein the adjustor reduces the resolution of the display screen when the viewing distance is larger than a first value.

6. The display device according to claim 3, wherein the adjustor increases the resolution of the display screen when the viewing distance is smaller than a second value.

7. The display device according to claim 3, wherein the processing unit is further used for obtaining an exit position of the first particle beam and an incident position of the first particle beam on the display screen, so as to obtain a first distance from the exit position to the incident position, obtain a second distance of propagation of the first particle beam according to an attenuated energy density of the first particle beam, and obtain the viewing distance according to the first distance and the second distance.

8. A display system comprising:
   the display device as claimed in claim 2, and
   a wearable device for emitting a second infrared light to the display device when the infrared light emitter does not emit the first infrared light,
   wherein the processing unit is further used for detecting an energy density of the received second infrared light, and the adjustor is further used for adjusting the resolution of the display screen according to the energy density of the received second infrared light.

9. A resolution adjustment method of the display system according to claim 8, comprising:
   emitting the second infrared light to a display device;
   detecting, by the display device, an energy density of the received second infrared light, and adjusting the resolution of the display screen according to the energy density of the received second infrared light.

10. The display device according to claim 2, wherein the processing unit determines the incident position of the first infrared light according to the first conducting line transmitting the scanning signal and the second conducting line transmitting the excitation current.

11. The display device according to claim 2,
    wherein the processing unit is further configured as a face recognition unit for recognizing whether the viewer's face faces towards the display screen,
    wherein the adjustor reduces the resolution of the display screen when the viewer's face does not face towards the display screen.

12. The distance sensing substrate according to claim 1, wherein each pixel area further comprises a pixel electrode,
    wherein the plurality of first conducting lines are formed over the plurality of gate lines, the plurality of second conducting lines are formed over the plurality of data lines, the switch thin film transistor is formed over the driving thin film transistor, and the receiving electrode is formed over the pixel electrode.

13. A resolution adjustment method for a display device having
    a display screen;
    a distance sensing substrate, wherein the distance sensing substrate comprises an infrared light emitter for emitting first infrared light to a viewer, an infrared light receiver for receiving the first infrared light reflected by the viewer, and a processing unit for obtaining an energy density of the emitted first particle beam and an energy density of the received first particle beam,
    wherein the infrared light receiver comprises:
    a plurality of first conducting lines arranged in a first direction and a plurality of second conducting lines arranged in a second direction, the plurality of first conducting lines and the plurality of second conducting lines intersecting with each other so as to define a plurality of receiving areas, wherein the plurality of first conducting lines transmit scanning signals line by line, wherein each receiving area comprises:

a receiving electrode for receiving the infrared light so as to generate an excitation current; and a switch thin film transistor for allowing conduction between the receiving electrode and a corresponding second conducting line when a corresponding first conducting line transmits a scanning signal, so as to enable the excitation current generated by the receiving electrode to be transmitted to the corresponding second conducting line, wherein the distance sensing substrate further comprises:

a plurality of gate lines and a plurality of data lines, the plurality of gate lines and the plurality of data lines intersecting with each other so as to define a plurality of pixel areas, each pixel area comprising a driving thin film transistor, and wherein projections of the plurality of first conducting lines and the plurality of gate lines on a base of the distance sensing substrate coincide, projections of the plurality of second conducting lines and the plurality of data lines on the base of the distance sensing substrate coincide, and projections of the switch thin film transistor and the driving thin film transistor on the base of the distance sensing substrate coincide; and the processing unit is further configured as an adjustor for adjusting a resolution of the display screen according to the energy density of the emitted first infrared light and the energy density of the received first infrared light; the resolution adjustment method comprising: emitting the first infrared light to a viewer; receiving the first infrared light reflected by the viewer; adjusting a resolution of the display screen according to an energy density of the emitted first infrared light and an energy density of the received first infrared light.

14. The resolution adjustment method according to claim 13, wherein the step of adjusting a resolution of the display screen according to an energy density of the emitted first infrared light and an energy density of the received first infrared light comprises:

obtaining a viewing distance according to the energy density of the emitted first infrared light and the energy density of the received first infrared light; and adjusting the resolution of the display screen based on the viewing distance.

15. The resolution adjustment method according to claim 14, wherein the step of obtaining a viewing distance according to the energy density of the emitted first infrared light and the energy density of the received first infrared light comprises:

obtaining an exit position of the first infrared light and an incident position of the first infrared light on the display screen, so as to obtain a first distance from the exit position to the incident position;

obtaining a second distance of propagation of the first infrared light according to an attenuated energy density of the first infrared light; and obtaining the viewing distance according to the first distance and the second distance.

16. The resolution adjustment method according to claim 14, wherein the step of adjusting a resolution of the display screen comprises:

reducing the resolution of the display screen when the viewing distance is larger than a first value.

17. The resolution adjustment method according to claim 14, wherein the step of adjusting a resolution of the display screen comprises:

increasing the resolution of the display screen when the viewing distance is smaller than a second value.

18. The resolution adjustment method according to claim 13, wherein the step of adjusting a resolution of the display screen according to an energy density of the emitted first infrared light and an energy density of the received first infrared light comprises:

obtaining an attenuated energy density of the first infrared light according to the energy density of the emitted first infrared light and the energy density of the received first infrared light, determining that a viewing distance is larger than a first value if the attenuated energy density is larger than a first preset value, and determining that the viewing distance is smaller than a second value if the attenuated energy density is smaller than a second preset value.

19. The resolution adjustment method according to claim 13, further comprising:

recognizing whether a viewer's face faces towards the display screen, and reducing the resolution of the display screen when the viewer's face does not face towards the display screen.

* * * * *